US010105779B2

(12) United States Patent
Griffin et al.

(10) Patent No.: US 10,105,779 B2
(45) Date of Patent: Oct. 23, 2018

(54) AMBIENT OXYGEN CONCENTRATING TORCH

(71) Applicants: Joey Griffin, Hermon, NY (US); Darryn Jay Dygert, Russell, NY (US)

(72) Inventors: Joey Griffin, Hermon, NY (US); Darryn Jay Dygert, Russell, NY (US)

( * ) Notice: Subject to any disclaimer, the term of this patent is extended or adjusted under 35 U.S.C. 154(b) by 94 days.

(21) Appl. No.: 15/205,361

(22) Filed: Jul. 8, 2016

(65) Prior Publication Data

US 2018/0009049 A1 Jan. 11, 2018

(51) Int. Cl.

*B23K 7/10* (2006.01)
*B23K 5/22* (2006.01)
*B01D 53/053* (2006.01)

(52) U.S. Cl.

CPC .............. *B23K 7/10* (2013.01); *B01D 53/053* (2013.01); *B23K 5/22* (2013.01); *B01D 2256/12* (2013.01); *B01D 2257/102* (2013.01); *B01D 2259/122* (2013.01)

(58) Field of Classification Search

CPC .................................. B23K 9/00; B23K 28/02
See application file for complete search history.

(56) References Cited

U.S. PATENT DOCUMENTS 5,726,416 A 3/1998 Katooka et al.
6,051,809 A 4/2000 Colella
6,194,682 B1 2/2001 Schneider et al.
7,105,774 B2 9/2006 Bender et al.
7,781,699 B2 8/2010 Schneider
8,859,928 B2 10/2014 Sommerfield
2014/0231400 A1 8/2014 Bankstahl

FOREIGN PATENT DOCUMENTS

CN 203171152 U * 9/2013
EP 0495760 A2 7/1992
EP 1698422 A2 9/2006

OTHER PUBLICATIONS

English Language translation of CN 203171152 U, Sep. 2013.*

* cited by examiner

*Primary Examiner* — Scott R Kastler
(74) *Attorney, Agent, or Firm* — Williams Intellectual Property; Benjamin F. Williams

(57) ABSTRACT

An ambient oxygen concentrating torch has an oxygen concentrating unit disposed in operational communication with a second compressor whereby oxygen is sourced from the ambient atmosphere by Pressure Swing Adsorption and producible for pressurization and storage interior to a pressure tank. Controlled release of the stored oxygen is thereby enabled for combination with a hydrocarbon to effect combustion and production of a high-temperature flame as used in welding and cutting. Because oxygen is sourced from the ambient environment, and is continuously producible therefrom, need of separate oxygen canisters is entirely obviated.

3 Claims, 3 Drawing Sheets

AMBIENT OXYGEN CONCENTRATING TORCH

FEDERALLY SPONSORED RESEARCH OR DEVELOPMENT

Not Applicable

CROSS-REFERENCE TO RELATED APPLICATIONS

Not Applicable

INCORPORATION BY REFERENCE OF MATERIAL SUBMITTED ON A COMPACT DISK

Not Applicable

SPECIFICATION

To All Whom It May Concern

Be it known that we, Joey Griffin and Darryn Jay Dygert, both citizens of the United States, have invented new and useful improvements in an ambient oxygen concentrating torch as described in this specification.

BACKGROUND OF THE INVENTION

Oxygen and hydrocarbons are readily combinable for combustion to produce a high-temperature flame controllable at a torch head, as is seen in the present state of the art. Typically, oxygen and a suitable hydrocarbon (such as acetylene, for example) are stored in separate pressurized containers for controlled release and combination at a torch head. Known volumes of gases are combinable at desired relative concentrations for combustion at the torch head productive for high-temperature work. A user must, therefore, interchange pressurized canisters when either fuel-type runs out, and thus have on-hand extra pressurized canisters in storage. Switching out canisters expends time otherwise better used performing work, and the additional canisters required must be housed, shipped, received, and brought to the job site.

The present invention obviates the need of a separate plurality of oxygen canisters entirely by effecting concentration of oxygen directly from the ambient atmosphere to continuously refill a pressure tank disposed in operational communication with a torch head. Thus oxygen is sourceable directly from the ambient environment and need of additional oxygen canisters is entirely obviated. This allows for continued production, and thus continual use, of oxygen in welding and cutting, and reduces storage, shipping and receiving requirements almost by half.

FIELD OF THE INVENTION

The present invention relates to an ambient oxygen concentrating torch having an oxygen concentrating unit disposed in operative communication with a second compressor whereby oxygen is concentrated from ambient air and compressed into a pressure tank for use in combination with a hydrocarbon source. Air is drawn into an oxygen concentrating unit where Pressure Swing Adsorption excludes gaseous nitrogen at surfaces of an adsorbent and oxygen is thereby concentrated at an oxygen outlet for pressurization and storage interior to a pressure tank. Oxygen is thus continuously generable even as it is used from the pressure tank. The pressure tank enables a regulated release of oxygen at a desired and controllable rate, whereby the pressure tank serves as a reservoir for consistent release and combination of oxygen in conjunction with a hydrocarbon whereby combustion and production of a high-temperature flame at the torch head is regulable.

SUMMARY OF THE INVENTION

The present ambient oxygen concentrating torch has been devised to enable continuous use of oxygen concentrated by Pressure Swing Adsorption (PSA) from the ambient atmosphere. Oxygen is concentrated at an oxygen outlet and pressurized for storage into a pressure tank for use upon demand. As such, use of refill pressurized oxygen canisters, as is typical in the present state of the art, is obviated.

As is well known in the art, PSA enables exclusion of nitrogen, for example, from ambient atmosphere pressurized through an adsorbent. Exclusion of nitrogen from ambient air therefore enables enrichment in oxygen, which oxygen is thence collectable at an oxygen outlet for pressurization through a second compressor for storage interior to a pressure tank. Regulation of compressed oxygen released from the pressure tank thus enables controlled oxidation of gaseous hydrocarbons combined with the oxygen at a torch head. Thus, only the hydrocarbon source is required to be supplied for use, as oxygen is continuously generable by action of PSA through an oxygen concentrating unit. As such, the present invention offers new and useful improvements in the welding and cutting arts by eliminating need of acquiring, transporting, and storing separate canisters containing oxygen.

The present ambient oxygen concentrating torch, therefore, includes a housing containing an oxygen concentrating unit devised to concentrate oxygen by PSA. Nitrogen is sorbed under pressure by action of a first compressor compressing ambient atmosphere through an adsorbent, such as a zeolite, for example. Oxygen passes through the porous adsorbent and is collected for compression by a second compressor for storage interior to a pressure tank. Subsequent depressurization of the zeolite enables release of nitrogen back into the atmosphere for repeated use of the adsorbent.

While each of the separate components comprising the instant device is connectable in series to perform the intended function herein described, a preferred embodiment of the present invention situates all components interior to a housing. Only the torch head, hydrocarbon source, and pressure tank are disposed exteriorly relative the housing. A user need only connect a hose to a suitable pressure tank in which to collect the oxygen concentrated by the device, and thence activate the oxygen concentrating unit, to begin concentrating oxygen at levels required to combine effectively with the hydrocarbon to produce a desired high-temperature flame usable to weld or cut metals, for example, as well as perform other high-temperature flame work, as desired.

An air intake is disposed upon the housing to force ambient atmosphere into the housing for compression by the first compressor. Air filters may be included to exclude particles and other agents (such as carbon dioxide, for example) from the effluent, and thus enable production of a desired concentration of oxygen for use in combination with the hydrocarbon at the torch head. A second compressor is disposed to compress concentrated oxygen for storage interior to a pressure tank. Thus, action of the oxygen concentrating unit pressurizes and stores oxygen concentrated from the ambient atmosphere for use when welding and/or cutting, as case may be.

The hydrocarbon source, as set forth herein, is contemplated to consist of any suitable hydrocarbon devised for use combined with oxygen for combustion at a torch head. The preferred embodiment contemplated herein makes use of acetylene, but additional and other hydrocarbons and combustible gases storable under pressure are contemplated herein (including hydrogen). The hydrocarbon source is a pressure tank containing the hydrocarbon (or other fuel) connectable to the torch head in the normal fashion. The torch head includes a pair of regulation dials whereby release of oxygen from the pressure tank and the hydrocarbon (or other fuel) from the other pressure tank is controllable, as desired, to produce a range of high-temperature flames usable in welding and/or cutting, as case may be.

Thus has been broadly outlined the more important features of the present ambient oxygen concentrating torch so that the detailed description thereof that follows may be better understood and in order that the present contribution to the art may be better appreciated.

Objects of the present ambient oxygen concentrating torch, along with various novel features that characterize the invention are particularly pointed out in the claims forming a part of this disclosure. For better understanding of the ambient oxygen concentrating torch, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
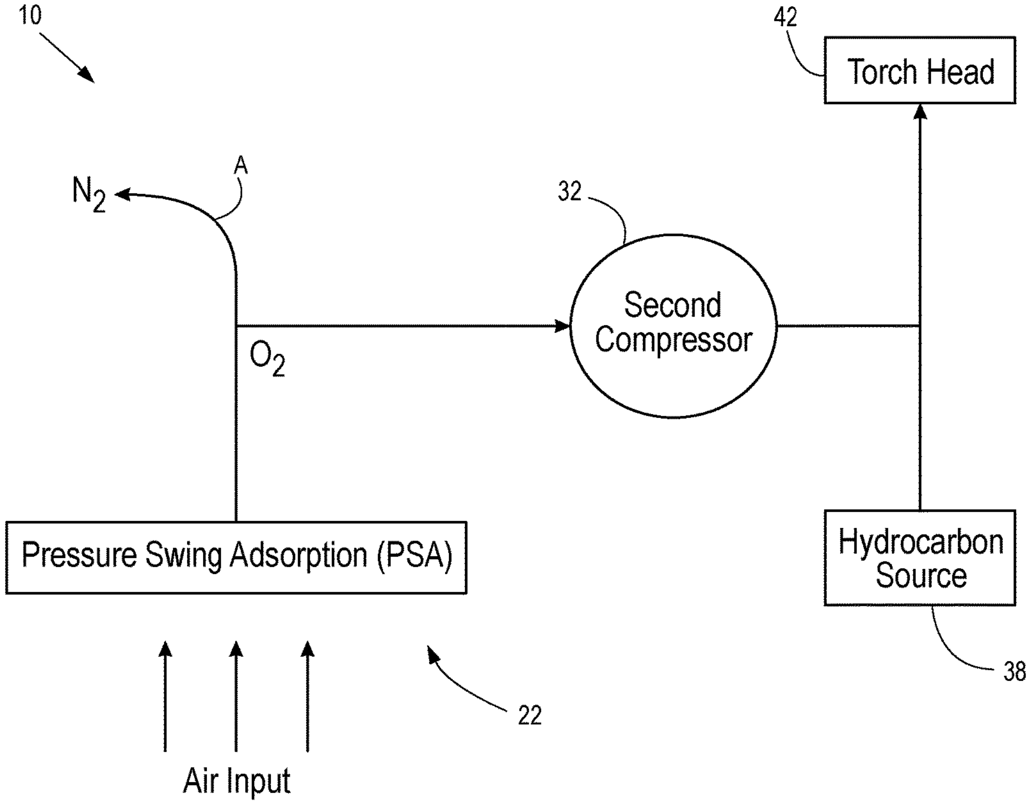
FIG. 1 is diagrammatic view of the present invention.
Figure 2:
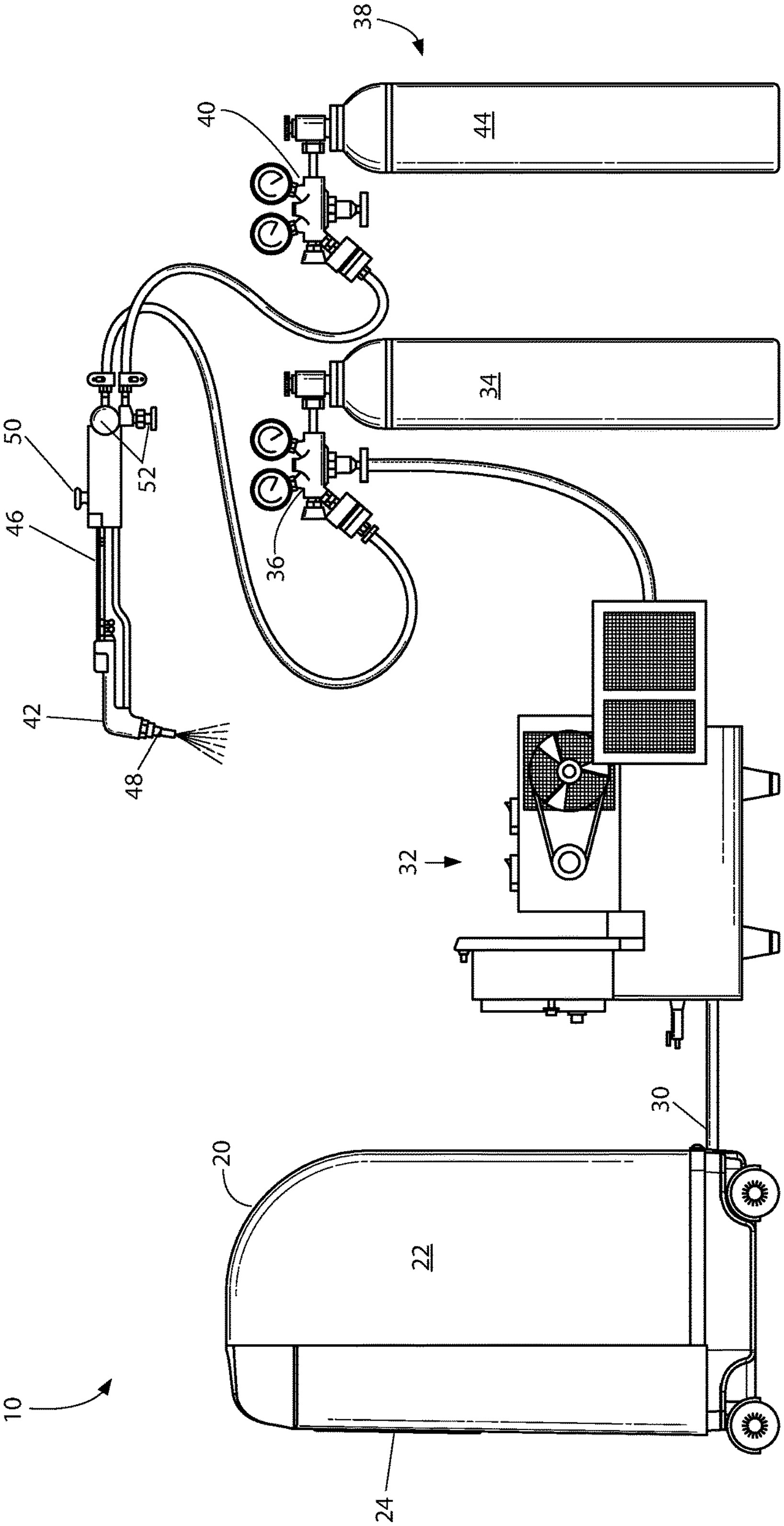
FIG. 2 is a side view of an example embodiment showing an oxygen concentrating unit in operative communication with a second compressor, a pressure tank, and a pressurized hydrocarbon source.
Figure 3:
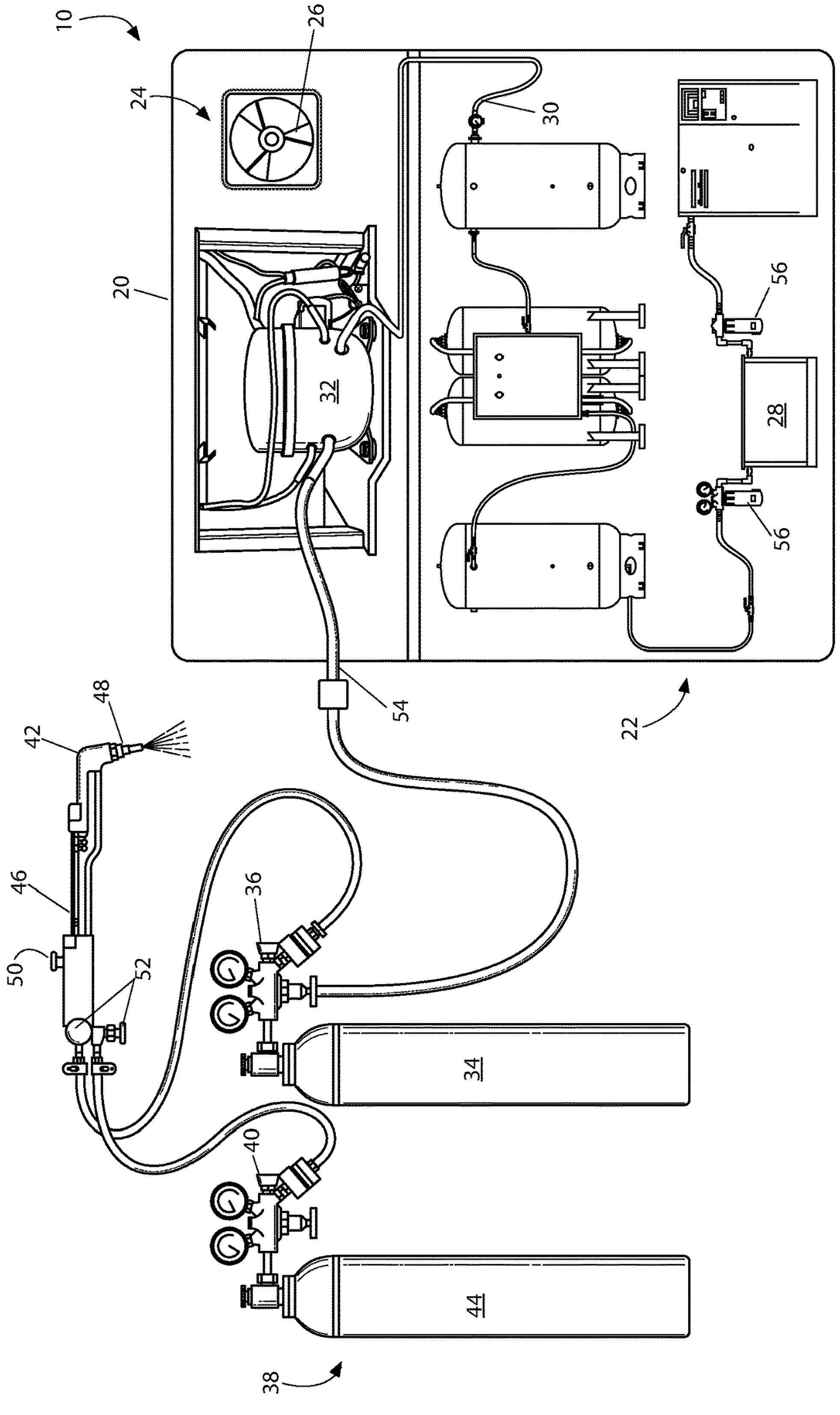
FIG. 3 is a side view of an example embodiment showing a housing having an oxygen concentrating unit disposed therein whereby a standalone unit is connectable to a pressure tank disposed in operative communication with a torch head and a hydrocarbon source.

With reference now to the drawings, and in particular FIGS. 1 through 3 thereof, example of the instant ambient oxygen concentrating torch employing the principles and concepts of the present ambient oxygen concentrating torch and generally designated by the reference number 10 will be described.

Referring to FIGS. 1 through 3 a preferred embodiment of the present ambient oxygen concentrating torch 10 is illustrated.

The present ambient oxygen concentrating torch 10 has been devised to enable action of a cutting torch by concentration of oxygen sourced from the ambient atmosphere whereby need of a separate and contained source of pressurized oxygen is obviated. The present ambient oxygen concentrating torch 10 includes an oxygen concentrating unit 22 effecting pressure swing adsorption (PSA) whereby nitrogen is excluded from an oxygen outlet 30 and ambient oxygen is thereby concentrated for pressurization at a second compressor 32 disposed in communication with a pressure tank 34 wherein oxygen is storable for use with a cutting and/or welding torch, as desired. The need of separate oxygen tanks, as is common in the present state of the art, is thereby obviated as ambient oxygen is continuously sourced from the surrounding atmosphere instead.

The present ambient oxygen concentrating torch 10, therefore, includes a housing 20 disposed to store an oxygen concentrating unit 22. The oxygen concentrating unit 22 includes an air intake 24 disposed in open communication through the housing 20 whereby inflow of ambient atmosphere is effective by action of a fan member 26. Atmosphere is drawn into the housing 20 through the air intake 24 for Pressure Swing Adsorption by action of an adsorbent sorbing gaseous nitrogen under pressure whereby oxygen is concentrated at an oxygen outlet 30 disposed upon the oxygen concentrating unit 22. A first compressor 28 compresses ambient atmosphere drawn into the oxygen concentrating unit 22 whereby nitrogen is sorbed to surfaces in the adsorbent, such as a zeolite, for example. Oxygen enriched atmosphere is thereby collectable at the oxygen outlet 30.

A second compressor 32, disposed within the housing 20, pressurizes oxygen emitted at the oxygen outlet 30 of the oxygen concentrating unit into a pressure tank 34 disposed to receive oxygen pressurized at the second compressor 32, said pressure tank 34 having a regulator 36 to control release of oxygen compressed therein. Oxygen is thus storable at pressure in the pressure tank 34 and releasable upon demand by action of the regulator 36 for combustion in wielding the cutting torch, as will be described subsequently.

A pressurized hydrocarbon source 38 is likewise included, having a regulator 40 to control emission of hydrocarbons from said hydrocarbon source 38, whereby gaseous hydrocarbons are producible for combustion with oxygen combinable at a torch head 42. The hydrocarbon source 38 shown herein includes a pressure tank 44 with acetylene therein, as is common in the welding and cutting arts, however additional hydrocarbons (s.a. alkynes, alkenes, alkanes, and the like) and other flammable gases (such as hydrogen, for example) are contemplated as usable with the present invention 10.

The torch head 42 is disposed in fluid communication with each pressure tank 34, 44 for manual wielding of the flame producible to perform high temperature work. The torch head 42 includes an elongate body 46, a nozzle 48 endwise disposed upon the elongate body 46, a depressible ignition switch 50, and a pair of regulation dials 52 to control the mixture of gases emitted and combusted at the nozzle 48. Thus varying combinations of oxygen and the gaseous hydrocarbon emitted from the hydrocarbon source 38 are producible to effect a plurality of flames usable for high-temperature work between various materials for which action of the cutting torch 10 is desirable.

Action of the oxygen concentrating unit 22 obviates any need of replacement oxygen canisters, as is typical in the state of the art presently, whereby welding and cutting actions are performable for longer durations and only suitable hydrocarbons need be shipped, received, stored, and transported for use.

FIG. 1 illustrates a diagrammatic view of the present apparatus 10, whereby nitrogen is excludable subsequent pressurization and sorption to an adsorbent (such as a zeolite, for example) effective at pressure, whence subsequent depressurization enables release of the excluded gas back to ambient atmosphere (see arrow A in FIG. 1).

Pressure Swing Adsorption is taken to include action of adsorbents including, for example, zeolite, activated carbon, silica, alumina, and other such multi-surfaced and porous mineral agents effecting preferential adsorption of particular gases to charged surfaces at targeted pressure ranges.

FIG. 2 illustrates a standalone oxygen concentrating unit 22 disposed in operational communication with a second compressor 32 exteriorly situated relative said oxygen concentrating unit 22. The second compressor 32 is disposed to compress oxygen concentrated by the oxygen concentrating unit 22 for storage interior to the pressure tank 34. Pressure tank 44 comprises the hydrocarbon source 38 for combination at the torch head 42.

FIG. 3 illustrates an oxygen concentrating unit 22 that includes the second compressor 32 interior to the housing. In this embodiment the housing 20 is simply connectable directly to pressure tank 34 by hose 54 for collection of oxygen concentrated by Pressure Swing Adsorption at the oxygen concentrating unit and thence pressurized by action of the second compressor 32. Oxygen is thus storable at pressure for combination with the hydrocarbon source 38, here illustrated as pressure tank 44.

In FIG. 3, the housing 20 is illustrated diagrammatically—actual dimensions of the housing 20 and its interior contents are not necessarily shown to scale, rather for conceptual apprehension by one having ordinary skill in the art, the present illustration enables replication and, thus, reduction of the present invention to practice. This conceptual form, therefore, is nonetheless useful for articulating the preferred embodiment of the present device 10, which is contemplated to include the oxygen concentrating unit 22, the first compressor 28, the second compressor 32, the air intake 24, and the oxygen outlet 30, all in a standalone housing 20 readily connectable by means of hose 54 to a pressure tank 34 for use with the torch head 42. Moreover, filters 56 are contemplated therein for exclusion of particles and other agents whereby regulation of a high-temperature flame is maintainable absent unwanted influence of additional particles, gases, or other agents preferably excluded from combustion at the torch head 42.

What is claimed is:

1. An ambient oxygen concentrating torch comprising:

an oxygen concentrating unit;

an air intake disposed upon the oxygen concentrating unit;

an oxygen outlet disposed upon the oxygen concentrating unit;

a compressor disposed to pressurize oxygen emitted at the oxygen outlet of the oxygen concentrating unit;

a hydrocarbon source having a regulator to control emission of hydrocarbons from said hydrocarbon source; and a torch head disposed in fluid communication with the compressor and the regulator of hydrocarbon source;

wherein the oxygen concentrating unit concentrates oxygen from ambient atmosphere and the compressor forces said oxygen to the torch head for combustion with hydrocarbons emitted form the hydrocarbon source whereby torch cutting and welding are enabled absent a separate canister of pressurized oxygen.

2. The ambient oxygen concentrating torch of claim 1 wherein the oxygen concentrating unit concentrates oxygen from ambient air by Pressure Swing Adsorption to exclude gaseous nitrogen from the oxygen outlet.

3. An ambient oxygen concentrating torch comprising:

a housing;

an oxygen concentrating unit disposed within the housing, said oxygen concentration unit separating oxygen from the ambient atmosphere and concentrating it by means of Pressure Swing Adsorption;

an air intake disposed upon the oxygen concentrating unit in open communication through the housing;

a first compressor in fluid communication with the air intake, said first compressor disposed to pressurize ambient atmosphere to concentrate oxygen by Pressure Swing Adsorption;

an oxygen outlet disposed upon the oxygen concentrating unit;

a second compressor disposed within the housing, said second compressor disposed to pressurize oxygen emitted at the oxygen outlet of the oxygen concentrating unit;

a pressure tank disposed to receive oxygen pressurized at the compressor, said pressure tank having a regulator to control release of oxygen compressed therein;

a hydrocarbon source having a regulator to control emission of hydrocarbons from said hydrocarbon source; and a torch head disposed in fluid communication with the pressure tank and the regulator of hydrocarbon source;

wherein the oxygen concentrating unit concentrates oxygen from ambient atmosphere and the compressor forces said oxygen to the torch head for combustion with hydrocarbons emitted form the hydrocarbon source whereby torch cutting and welding are enabled absent a separate canister of pressurized oxygen.

* * * * *